United States Patent
Verheye et al.

(10) Patent No.: US 6,929,334 B2
(45) Date of Patent: Aug. 16, 2005

(54) CATERPILLAR TRACK TENSION MANAGEMENT

(75) Inventors: Carlos J. A. Verheye, Roeselare (BE);
Thierry E. G. Devriese, Bruges (BE);
Tom A. De Lathauwer, Lede (BE);
Jean-Pierre Vandendriessche, Erpe-Mere (BE)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/435,268

(22) Filed: May 9, 2003

(65) Prior Publication Data

US 2004/0026994 A1 Feb. 12, 2004

(30) Foreign Application Priority Data

May 11, 2002 (GB) .............................................. 0210804

(51) Int. Cl.⁷ ........................... B62D 55/00; F16H 7/08; E03B 11/00

(52) U.S. Cl. ....................... 305/149; 305/143; 137/255

(58) Field of Search ................................. 305/143–145, 305/149; 56/10.1; 137/255, 256, 563, 571, 594, 595, 613; 180/9.1; 198/813

(56) References Cited

U.S. PATENT DOCUMENTS

| | | | | |
|---|---|---|---|---|
| 3,496,879 A | * | 2/1970 | Brandes | 417/46 |
| 4,007,826 A | * | 2/1977 | Brown et al. | 198/813 |
| 4,928,460 A | * | 5/1990 | Bruer et al. | 56/14.6 |
| 5,313,795 A | * | 5/1994 | Dunn | 60/413 |
| 5,378,204 A | | 1/1995 | Urvoy | 474/110 |
| 5,607,027 A | * | 3/1997 | Puett, Jr. | 180/242 |
| 5,738,421 A | * | 4/1998 | Neymans et al. | 305/144 |
| 5,984,436 A | * | 11/1999 | Hall | 305/145 |
| 6,106,082 A | | 8/2000 | Gustin | 305/145 |
| 6,224,172 B1 | * | 5/2001 | Goodwin | 305/145 |
| 6,336,690 B2 | * | 1/2002 | Toms et al. | 305/145 |
| 6,520,520 B2 | * | 2/2003 | Howard | 280/90 |
| 6,551,076 B2 | * | 4/2003 | Boulware | 417/380 |
| 6,669,208 B1 | * | 12/2003 | Monk et al. | 280/5.506 |

* cited by examiner

Primary Examiner—Russell D. Stormer
Assistant Examiner—Jason R. Bellinger
(74) Attorney, Agent, or Firm—Rebecca Henkel; Brant T. Maurer

(57) ABSTRACT

A management system is disclosed for controlling the tension of an endless track by regulating the hydraulic pressure in a hydraulic jack acting on a roller serving to tension the track. The tension management system comprises two accumulators of different capacity that are connected to the jack. Both accumulators are in permanent direct communication with the jack and the larger accumulator is preloaded to a higher pressure than the smaller accumulator.

20 Claims, 2 Drawing Sheets

CATERPILLAR TRACK TENSION MANAGEMENT

FIELD OF INVENTION

The present invention relates to a system for regulating the tension in the endless track of a track laying vehicle and in particular an agricultural vehicle. The invention also relates to a combine harvester driven by an endless track having a tension management system.

BACKGROUND OF THE INVENTION

FIG. 1 is a schematic representation of a track system. An endless track 10, which may be a chain or a rubber belt, passes over a drive wheel or sprocket 12 and is guided over a track roller assembly 14 that can pivot about an axis 16. The assembly 14 carries rollers 18 which guide the track 10 and maintain it in contact with the ground.

In such a track system, it is important to maintain the correct tension in the track. If the track is allowed to become too slack, it can come away from its drive wheel 12 and guide rollers 18. On the other hand, if excessive tension is allowed to develop in the track, then damage can be caused to the track system.

The track therefore requires a tension management system which must be capable of allowing for the various events encountered during vehicle operation that affect the tension in the track. In particular, Vibrations caused by uneven rotation of the drive wheel or uneven resistance in the guide rollers;

Variation in the length of the track due to wear and strain elongation;

Variation in the path followed by the track resulting from ingested debris becoming trapped between the track and its drive wheel or guide rollers;

Changes in the geometry of the track as it goes round, for example if the drive or guide elements are polygonal instead of being circular or when the track is a chain having long rigid links;

Changes in the attitude of the track roller assembly if its pivotal axis does not coincide with the axis of the drive wheel; and Changes in ground inclination especially when the vehicle is driven over the brow of a hill.

It will be noted that some of these changes, notably vibrations in the drive train, are of relatively low amplitude and high frequency. On the other hand, when the vehicle is driven over the brow of a hill, the transition from driving uphill to engine braking downhill causes a high amplitude step change in the track tension.

The prior art solutions to this problem include tensioning systems that use a screw to adjust the position of a track tensioning idler roller as well as more complex mechanical arrangements that allow recoil but these have not proved satisfactory.

U.S. Pat. No. 6,106,082, which represents the closest known prior art to the present invention, describes a tension management system for controlling the tension of an endless track by regulating the hydraulic pressure in a hydraulic jack 20 acting on a idler 22 serving to tension the track. The tension management system comprises two accumulators of different capacity that are connected to the jack. An accumulator normally consists of a tank of which the interior is divided by a diaphragm into two separate chambers, one filled with hydraulic fluid and the other with gas. The gas filled chamber is preloaded to a given pressure and acts as a spring. The operation of an accumulator is analogous to a hydraulic cylinder in which movement of the piston is opposed by a mechanical spring, the stiffness of the spring being determined by the pressure preloading of the gas filled chamber.

In U.S. Pat. No. 6,106,082, the smaller accumulator permanently communicates with the hydraulic jack and acts as an air spring to absorb low amplitude vibrations and shocks. The larger accumulator is connected to the jack through a pressure relief valve and a non-return valve arranged in parallel with one another. The second accumulator only comes into play when the volume of the hydraulic fluid displaced from the jack exceeds the capacity of the first accumulator, as may occur in the example given above of the vehicle being drive over the brow of a hill. When the capacity of the first accumulator is exceeded, the pressure in the jack will continue to rise until the pressure of the relief valve is reached. At this point, the relief valve opens to allow hydraulic fluid to flow to the second accumulator in order to limit the pressure rise in the jack and hence the tension in the track. When the pressure in the jack later drops, the hydraulic fluid stored in the second accumulator is returned to the jack and the first accumulator through the non-return valve.

SUMMARY OF INVENTION

According to a first aspect of the present invention, there is provided a tension management system for controlling the tension of an endless track by regulating the hydraulic pressure in a hydraulic jack acting on a roller serving to tension the track. The tension management system comprises two accumulators of different capacity that are connected to the jack. Both accumulators are in permanent direct communication with the jack and the larger accumulator is preloaded to a higher pressure than the smaller accumulator.

The accumulators in U.S. Pat. No. 6,106,082 have the same pressure preloading. As a result, the tension management system effectively only provides one spring rate and its mechanical effect could be achieved by using a single large accumulator permanently connected to the jack. The advantage that is achieved by the use of two accumulators is that cost is reduced because a large accumulator permanently connected to the jack would need to be constructed in a more expensive manner.

In the present invention, on the other hand, two accumulators are used in order to achieve a variable spring rate. When the pressure in the jack increases at first, only the smaller accumulator responds because it is preloaded to a lower pressure. Hydraulic fluid will therefore only flow between the smaller accumulator and the jack during smaller movements and vibrations of the track, and for these smaller shocks the first accumulator will act as a relatively soft spring. When the movement of the jack exceeds the capacity of the first accumulator, the pressure will rise to the point where the second accumulator comes into play. During such larger movements, no more fluid will flow to the first accumulator (because it has already been filled to its maximum capacity) and all the fluid will flow to the second accumulator, which will now behave as a stiffer spring.

Because the accumulators are differently preloaded, they can both be in permanent communication with the hydraulic jack avoiding the need for additional pressure relief and non-return valves.

It should be added that the teaching of the present invention and that of U.S. Pat. No. 6,106,082 are not mutually exclusive and it is possible for them to be combined.

Hence, in a second aspect of the present invention, there is provided a tension management system for controlling the tension of an endless track by regulating the hydraulic pressure in a hydraulic jack acting on a roller serving to tension the track. The tension management system comprises two accumulators of different capacity that are connected to the jack. The smaller accumulator is in permanent direct communication with the jack and the larger accumulator is connected to the jack through a parallel combination of a pressure relief valve and a non-return valve. The pressure relief valve permits flow of hydraulic fluid to the second accumulator when a predetermined opening pressure is exceeded in the jack. The non-return valve permits flow from the second accumulator to the jack. A third accumulator is permanently connected to the jack. The third accumulator has a greater capacity than the first accumulator and is preloaded to a pressure greater than the pressure of the first accumulator but less than the opening pressure of the pressure relief valve.

In this aspect of the present invention, the first and second accumulators can be preloaded to the same pressure but a variable spring rate is achieved by connecting a third accumulator in parallel with the first accumulator, the third accumulator having a higher preloading pressure than the first accumulator. Hence, in operation, fluid displacements to and from the tensioning jack having a volume lying below a first threshold will flow only to the first accumulator. When the first threshold is exceeded, the third accumulator will come into play to take up the flow that exceeds the capacity of the first accumulator until the total volume reaches a second threshold. At that point, the pressure relieve valve will open to bring the second accumulator into play. The combination of all three accumulators enables the tension management system to provide smooth and safe operation of the endless track over a wide dynamic range.

It is preferred to provide a throttled passage in parallel with both the non-return valve and the pressure relief valve. The effect of the throttled passage is to allow the second accumulator, which preferably has a similar preloading to the first accumulator, to respond to slow changes in track tension, such as might be caused by prolongation of the endless track.

In the preferred embodiment of the invention, the first accumulator has a capacity of 0.3 litres and a preloading of 30 bar, the second has a capacity of 2 litres and a preloading of 30 bar, the third has a capacity of 1 litre and a preloading of 150 bar and the opening pressure of the pressure relief valve is 220 bar.

Both of the above aspects of the invention provide tension management systems having a closed hydraulic circuit, in that over the entire working range of the jack any hydraulic fluid displaced from the jack is stored in one or other of the accumulator and does not have to be drained to an unpressurised reservoir. Because during normal operation fluid is never drained from the circuit to avoid excessive pressure build-up, the circuit does not need to be replenished once it has been initially charged during manufacture or servicing.

In U.S. Pat. No. 6,106,082, a dedicated hydraulic pump is used for charging the hydraulic circuit but the present invention also recognises in a further aspect that in certain applications, in particular in a combine harvester, this task can be performed in a more cost effective manner.

Hence, in accordance with a further aspect of the invention, there is provided a combine harvester driven by means of an endless track. The harvester comprises a hydraulic track tension management system having a closed hydraulic circuit that does not require replenishment with hydraulic fluid during normal operation, and an unloading auger positioned by means of a jack connected to a hydraulic pump. The hydraulic pump of the unloading auger is connected by means of a normally closed valve to the hydraulic circuit of the tension management system. The valve is operable to permit the hydraulic pump of the unloading auger to charge the hydraulic circuit of the track tension management system.

The output pressure of the hydraulic pump for positioning the unloading auger is typically 180 bar which is much higher than the ideal pressure required for charging the hydraulic circuit of the track tension management system. For this reason, it is preferred to provide a pressure regulating valve in series with the normally closed valve to reduce the output pressure of the hydraulic pump of the auger prior to its application to the hydraulic circuit of the track tension management system.

A pressure regulating valve is typically a spool valve which is biased by means of a spring at one end of the valve spool towards a fully open position. A pilot pressure derived from its output port is applied to a control chamber at the opposite end of the valve spool and acts to move the spool against the action of the spring to a position where it uncovers a spill port. When the spill port is uncovered, the output port is connected to a drain and the pressure in it therefore drops.

If such a spool valve is permanently connected directly to the hydraulic circuit of the track tension management system, it is possible that the valve spool may be moved by a surge of pressure in the hydraulic circuit to drain fluid from the circuit. To prevent this, it is desirable to connect a non-return valve between the pressure regulating valve and the hydraulic circuit of the track tension management system so that fluid can never be drained from the closed hydraulic circuit of the track tension management system through the action of the pressure regulating valve.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
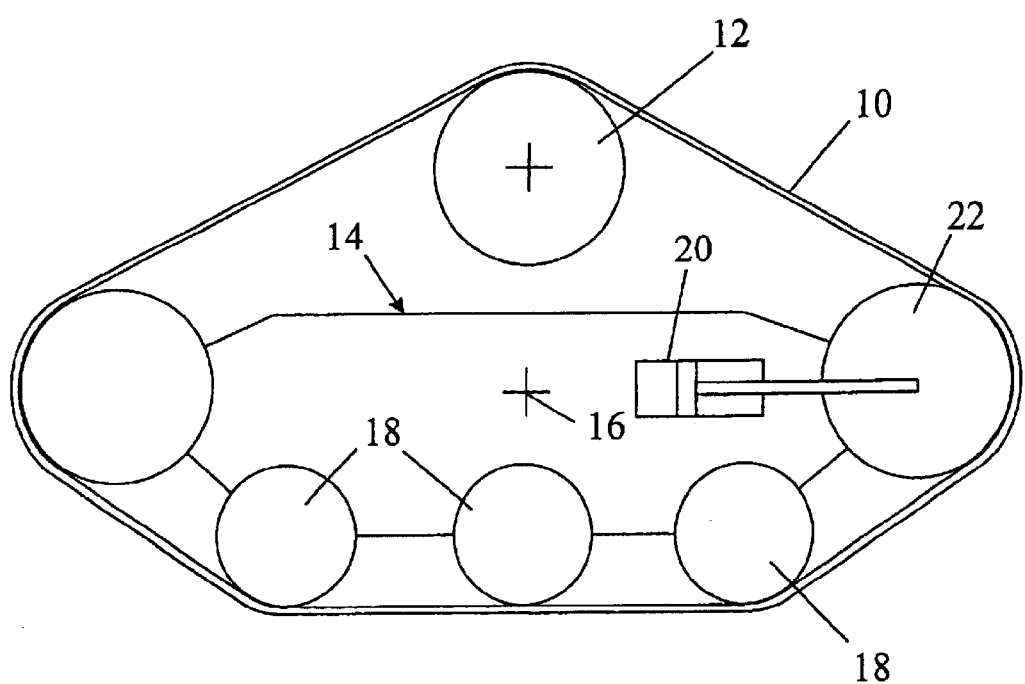
FIG. 1 is a schematic representation of a track system to which reference has been made above.
Figure 2:
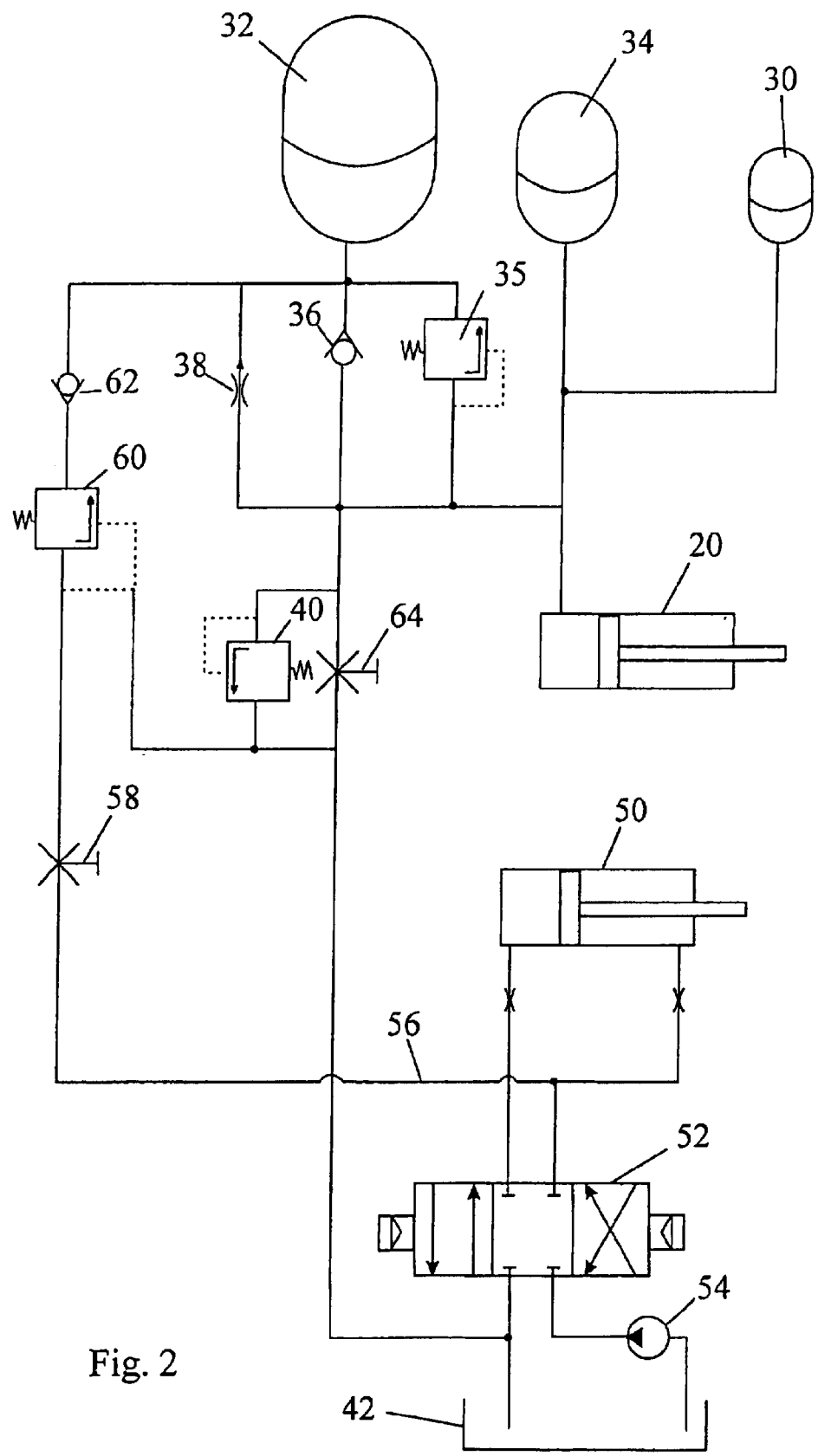
FIG. 2 is a hydraulic circuit diagram of a track tension management system that embodies all three aspects of the present invention.

FIG. 2 shows a hydraulic circuit for regulating the pressure in the working chamber of the hydraulic jack 20 that acts on the tensioning idler 22 in FIG. 1. The hydraulic circuit comprises a small first accumulator 30 directly connected to the jack 20 and a larger second accumulator 32 connected to the jack 20 through a parallel combination of a pressure relief valve 35 and a non-return valve 36. The first and second accumulators 30 and 32 are preloaded to the same pressure, typically 30 bar, and their capacities may suitably be 0.3 litres and 2 litres respectively. As so far described, the tension management system is generally similar to that described in the '082 patent referred to above.

A third accumulator 34 is connected directly to the jack 20, the latter accumulator being larger than the first accumulator 30 and smaller than the second accumulator 32.

Typically, the third accumulator 34 may have a capacity of 1 litre. Unlike the other two accumulators the third accumulator 34 is preloaded to a high pressure, typically 150 bar or some five times the preloading pressure of the other two accumulators. If the accumulators have the preloading pressures given above, the pressure relief valve 35 would be designed to open when the pressure in the working chamber of the hydraulic jack 20 reaches a value of 220 bar.

A throttle 38 is connected in parallel with the pressure relief valve 35 and the non-return valve 36, the throttle 38 permitting hydraulic fluid to bleed slowly (0.16 litres per minute) into the second accumulator 32.

Lastly, the jack 20 is connected to an over-pressure safety valve 40. This valve should remain closed during normal operation but in the event that an upper threshold pressure is reached, for example 300 bar, the valve 40 opens and allows hydraulic fluid to be drained from the hydraulic circuit into a tank 42 under atmospheric pressure. If the safety valve 40 should ever come into operation, the tension management system will require servicing to replenish the drained fluid.

The remaining illustrated components do not form part of the tension management system but of a charging system for filling the hydraulic circuit with fluid.

In FIG. 2, a second jack 50 as illustrated is connected to a grain unloading auger of a combine harvester and is used to swing the auger between different positions. The jack 50 is connected through a three way valve 52 to a hydraulic pump 54 which draws hydraulic fluid from the reservoir 42. In the illustrated position of the three way valve 52, the auger is locked in its position and it can be rotated clockwise and anticlockwise about a vertical axis by moving the spool of the valve 52 to the left and to the right. It should be stressed that the components 50, 52 and 54 form part of the equipment normally found on a combine harvester and are not provided for the specific purpose of filling the hydraulic circuit of the track tension management system with fluid. The illustrated embodiment of the invention makes use of the hydraulic pump 54 which is already present to position the auger to avoid the need of providing a further pump for the specific purpose of filling the track tension management system.

When the spool of the valve 52 is moved to the right, as drawn, the line 56 is connected to the output of the pump 54 and is at a pressure of typically 180 bar. This high pressure line 56 is connected to the third accumulator 32 through a series combination of a manually operated valve 58, a pressure regulating valve 60 and a non-return valve 62. A further manually operated valve 64 is connected in parallel with the safety valve 40.

The valve 64 is opened manually to drain the track tension management system. When it is open, the preloading of the accumulators 30, 32 and 34 will expel any hydraulic fluid that is stored within them and this will drain to the reservoir 42 flowing in the case of the second accumulator 32 through the non-return valve 36. With the pressure in the jack 20 reduced to atmospheric pressure, the idler 22 ceases to tension the endless track 10 which can therefore be removed for servicing.

To render the track tension management system operational, it must first be refilled with hydraulic fluid. This is achieved by first operating the valve 52 to pressurise the line 56 which will act to retract the piston of the jack 50 that positions the auger of the combine harvester which is driven by the endless track. With the line 56 pressurised, and the manual valve 64 closed, the valve 58 is opened manually. Fluid will then flow to the pressure regulating valve 60 which functions in the manner previously described to reduce the pressure from 180 bar to e.g. 50 bar. The fluid then passes through the non-return valve 62 into the hydraulic circuit of the track tension management system. The fluid partially fills the first and second accumulators 30 and 32, flowing through the non-return valve 36 to reach the first accumulator. When the pressure in the jack 20 reaches 50 bar, no further fluid flow occurs and the track tension management system is full and ready for operation. At this point, the valve 58 is closed and the non-return valve 62 ensures that no hydraulic fluid escapes through the line used to charge it.

With the jack 20 pressurised to 50 bar, the tensioning idler 22 acts on the track to maintain it taut. The various events described above will affect the shape of the endless track and unless the tensioning roller can follow such changes in shape the belt tension will either become too tight or too slack. The piston of the jack is therefore required to move and in the present invention this is achieved by the use of a closed hydraulic circuit that includes the three accumulators 30, 32 and 34.

When the pressure in the jack rises slowly and gradually, the fluid displaced from the jack 20 flows through the throttle 38 to the accumulator 32.

Small rapid movements of the endless track 10 will expel fluid from the jack 20 at a rate that cannot flow through the throttle 38. The fluid flow during such low amplitude oscillations of the track is stored in accumulator 30 provided that the displaced volume of fluid does not exceed 0.3 litres, being the capacity of the first accumulator 30. To such low amplitude oscillations of the track, the accumulator 30 will behave in the track tension management system as a weak spring.

If the oscillations are of higher amplitude or if there is a sudden large movement of the track on account of debris being trapped between the track and the guide rollers, as the first accumulator 30 reaches its maximum capacity the pressure in the jack will exceed 150 bar. Fluid can now for the first time flow into the more highly preloaded third accumulator 34 and the tension management system will behave as a stronger spring.

If the engine driving the endless track should suddenly be used as a brake, such as when the vehicle is driven over the brow of a hill, the tension in the endless track will undergo a very high amplitude step change. If the amplitude of the step is sufficiently high and the step sufficiently prolonged, the volume of fluid displaced from the jack 20 will exceed the combined capacities of the first and third accumulators and the pressure in the jack 20 will continue to rise. When the pressure reaches 220 bar, the relief valve 35 will open and allow fluid to flow rapidly into the second accumulator 32 both from the jack 20 and from the first and third accumulators (because their internal pressure at that moment also will reach 220 bar). The pressure in the jack 20 will therefore be maintained at the value of 220 bar until the second accumulator is full, or until pressure drops below 220 bar, resulting in the closure of valve 35.

The dimensions of the three accumulators are chosen such that they can accommodate between them all movements of the endless track encountered during normal operation. If something abnormal should occur (for example if the relief valve 35 should develop a fault and fail to open) then, if a maximum safe threshold of 300 bar is exceeded, the safety valve 40 is opened to drain fluid from the hydraulic circuit. As fluid is then lost from the track tension management system, the system will need to be serviced and replenished before normal operation can be resumed.

Having thus described the invention, what is claimed is:

1. A tension management system for controlling the tension of an endless track by regulating the hydraulic pressure in a hydraulic jack acting on a roller serving to tension the track, the tension management system comprising:
   a first and a second accumulator each of different capacity that are connected to the jack, the smaller first accumulator being in permanent direct communication with the jack and the larger second accumulator being connected to the jack through a parallel combination of a pressure relief valve and a non-return valve, the pressure relief valve permitting flow of hydraulic fluid to the second accumulator when a predetermined opening pressure is exceeded in the jack and the non-return valve permitting flow from the second accumulator to the jack;
   a third accumulator that is permanently connected to the jack, the third accumulator having a greater capacity than the first accumulator and being preloaded to a pressure greater than the pressure of the first accumulator but less than the opening pressure of the pressure relief valve; and
   a throttled passage connected in parallel with both the non-return valve and the pressure relief valve.

2. A tension management system as claimed in claim 1, wherein the first accumulator has a capacity of 0.3 litres and a preloading of 30 bar, the second accumulator has a capacity of 2 litres and a preloading of 30 bar, the third accumulator has a capacity of 1 litre and a preloading of 150 bar and the opening pressure of the pressure relief valve is 220 bar.

3. A tension management system as claimed in claim 1, wherein the first accumulator has a capacity of 0.3 litres and a preloading off 30 bar, the second accumulator has a capacity of 2 litres and a preloading of 30 bar, the third accumulator has a capacity of 1 litre and a preloading of 150 bar and the opening pressure of the pressure relief valve is 220 bar.

4. A tension management system as claimed in claim 1, wherein the throttled passage is dimensioned to permit a maximum flow rate of 0.16 litres per minute.

5. A tension management system as claimed in claim 2, wherein the throttled passage is dimensioned to permit a maximum flow rate of 0.16 litres per minute.

6. A tension management system as claimed in claim 3, wherein the throttled passage is dimensioned to permit a maximum flow rate of 0.16 litres per minute.

7. A tension management system as claimed in any of claim 1, wherein a safety valve is provided to connect the jack to a reservoir under atmospheric pressure if a maximum safe pressure is exceeded.

8. A tension management system as claimed in any of claim 2, wherein a safety valve is provided to connect the jack to a reservoir under atmospheric pressure if a maximum safe pressure is exceeded.

9. A tension management system as claimed in any of claim 3, wherein a safety valve is provided to connect the jack to a reservoir under atmospheric pressure if a maximum safe pressure is exceeded.

10. A tension management system as claimed in any of claim 4, wherein a safety valve is provided to connect the jack to a reservoir under atmospheric pressure if a maximum safe pressure is exceeded.

11. A tension management system as claimed in any of claim 5, wherein a safety valve is provided to connect the jack to a reservoir under atmospheric pressure if a maximum safe pressure is exceeded.

12. A tension management system as claimed in any of claim 6, wherein a safety valve is provided to connect the jack to a reservoir under atmospheric pressure if a maximum safe pressure is exceeded.

13. A combine harvester, comprising:
    an endless track;
    a hydraulic track tension management system in operative connection to the endless track, the hydraulic track tension management system for controlling the tension of the endless track by regulating a hydraulic pressure in a hydraulic jack acting on a roller serving to tension the track, the hydraulic track tension management system comprising:
    a first and a second accumulator each of different capacity that are connected to the jack, the smaller first accumulator being in permanent direct communication with the jack and the larger second accumulator being connected to the jack through a parallel combination of a pressure relief valve and a non-return valve, the pressure relief valve permitting flow of hydraulic fluid to the second accumulator when a predetermined opening pressure is exceeded in the jack and the non-return valve permitting flow from the second accumulator to the jack, and
    a third accumulator that is permanently connected to the jack, the third accumulator having a greater capacity than the first accumulator and being preloaded to a pressure greater than the pressure of the first accumulator but less than the opening pressure of the pressure relief valve, wherein a throttled passage is provided in parallel with both the non-return valve and the pressure relief valve; and
    an unloading auger positioned by means of the jack connected to the hydraulic pump, wherein the hydraulic pump of the unloading auger is connected by means of a normally closed valve to the hydraulic track tension management system, the normally closed valve in an open position operable to permit the hydraulic pump of the unloading auger to charge the hydraulic track tension management system.

14. A combine harvester, comprising:
    an endless track;
    a hydraulic jack;
    a roller operatively connected to the hydraulic jack and the endless track; and
    a tension management system for controlling the tension of an endless track by regulating the hydraulic pressure in the hydraulic jack acting on the roller serving to tension the track, the tension management system comprising:
    a first and a second accumulator each of different capacity that are connected to the jack, the smaller first accumulator being in permanent direct communication with the jack,
    a parallel combination of a pressure relief valve and a non-return valve connecting the larger second accumulator to the jack, the pressure relief valve permitting flow of hydraulic fluid to the second accumulator when a predetermined opening pressure is exceeded in the jack and the non-return valve permitting flow from the second accumulator to the jack,
    a third accumulator permanently connected to the jack, the third accumulator having a greater capacity than the first accumulator and being preloaded to a pressure greater than the pressure of the first accumulator but less than the opening pressure of the pressure relief valve, and
    a throttled passage connected in parallel with both the non-return valve and the pressure relief valve.

15. A combine harvester as claimed in claim 14, further including an unloading auger positioned by means of the jack connected to the hydraulic pump.

16. A combine harvester as recited in claim 15, wherein the hydraulic pump is connected by means of a normally closed valve to the hydraulic track tension management system, the normally closed valve in an open position operable to permit the hydraulic pump to charge the hydraulic track tension management system.

17. A combine harvester as claimed in claim 14, wherein the first accumulator has a capacity of 0.3 litres and a preloading of 30 bar, the second accumulator has a capacity of 2 litres and a preloading of 30 bar, the third accumulator has a capacity of 1 litre and a preloading of 150 bar and the opening pressure of the pressure relief valve is 220 bar.

18. A combine harvester as claimed in claim 14, wherein the first accumulator has a capacity of 0.3 litres and a preloading of 30 bar, the second accumulator has a capacity of 2 litres and a preloading of 30 bar, the third accumulator has a capacity of 1 litre and a preloading of 150 bar and the opening pressure of the pressure relief valve is 220 bar.

19. A combine harvester as claimed in claim 14, wherein the throttled passage is dimensioned to permit a maximum flow rate of 0.16 litres per minute.

20. A combine harvester as claimed in claim 14, further including a safety valve configured to connect the jack to a reservoir under atmospheric pressure if a maximum safe pressure is exceeded.

* * * * *